United States Patent
Dubois et al.

(10) Patent No.: US 10,677,193 B2
(45) Date of Patent: Jun. 9, 2020

(54) REAR FRAME FOR A THRUST REVERSER STRUCTURE WITH DIVERSION GRIDS

(71) Applicant: SAFRAN NACELLES, Gonfreville l'Orcher (FR)

(72) Inventors: Laurent Dubois, Gonfreville l'Orcher (FR); Laurent Ferrocino, Gonfreville l'Orcher (FR); Kamal Hafidi, Gonfreville l'Orcher (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 420 days.

(21) Appl. No.: 15/397,833

(22) Filed: Jan. 4, 2017

(65) Prior Publication Data
US 2017/0114751 A1   Apr. 27, 2017

Related U.S. Application Data

(63) Continuation of application No. PCT/FR2015/051852, filed on Jul. 3, 2015.

(30) Foreign Application Priority Data

Jul. 4, 2014 (FR) ...................................... 14 56475

(51) Int. Cl.
*F02K 1/72* (2006.01)
*F02K 1/80* (2006.01)
*F02K 1/70* (2006.01)

(52) U.S. Cl.
CPC ................. *F02K 1/72* (2013.01); *F02K 1/70* (2013.01); *F02K 1/80* (2013.01);
(Continued)

(58) Field of Classification Search
CPC ... F02K 1/80; F02K 1/625; F02K 1/72; F05D 2240/129; F05D 2240/90
See application file for complete search history.

(56) References Cited

U.S. PATENT DOCUMENTS

| 7,546,743 B2 | 6/2009 | Bulman et al. |
| 8,726,675 B2 * | 5/2014 | Keith ..................... F01D 25/243 60/796 |

(Continued)

FOREIGN PATENT DOCUMENTS

| CA | 2882166 | * | 3/2014 | ............... F02K 1/72 |
| EP | 1457659 | | 9/2004 | |

(Continued)

OTHER PUBLICATIONS

International Search Report for International Application PCT/FR2015/051852, dated Oct. 13, 2015.

*Primary Examiner* — Andrew H Nguyen
(74) *Attorney, Agent, or Firm* — Burris Law, PLLC

(57) ABSTRACT

The present disclosure relates to the field of aircraft nacelles and concerns thrust reverser devices. More particularly, the present disclosure concerns a rear frame for a thrust reverser structure with a cascade vane of an aircraft nacelle, the nacelle comprising at least two longitudinal beams. The rear frame is intended to be attached to the two beams and to hold in place one or more cascade vanes in cooperation with a front frame. The rear frame comprises a common section having a substantially headband-like shape.

10 Claims, 2 Drawing Sheets

(52) U.S. Cl.
CPC .... *F05D 2220/323* (2013.01); *F05D 2230/53* (2013.01); *F05D 2260/30* (2013.01); *F05D 2300/603* (2013.01); *Y02T 50/672* (2013.01)

(56) References Cited

U.S. PATENT DOCUMENTS

| | | | |
|---|---|---|---|
| 2011/0284660 A1 | 11/2011 | Aircelle | |
| 2012/0256051 A1* | 10/2012 | Bellanger | F02K 1/72 244/110 B |
| 2013/0227952 A1* | 9/2013 | Grip | F02K 1/80 60/770 |
| 2016/0273489 A1* | 9/2016 | Bunel | B64D 27/18 |

FOREIGN PATENT DOCUMENTS

| | | | | |
|---|---|---|---|---|
| EP | 2466101 | | 6/2012 | |
| EP | 2647847 | | 10/2013 | |
| FR | 2999239 | * | 6/2014 | ............ F02K 1/72 |
| RU | 2339439 | | 11/2008 | |
| RU | 2450151 | | 5/2012 | |
| WO | 2013/014350 | | 1/2013 | |
| WO | 2014/044964 | | 3/2014 | |

* cited by examiner

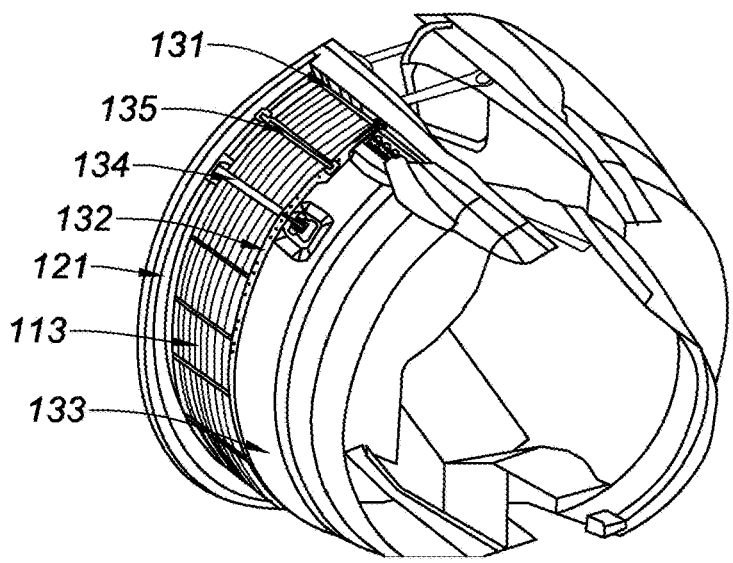
Fig. 3a
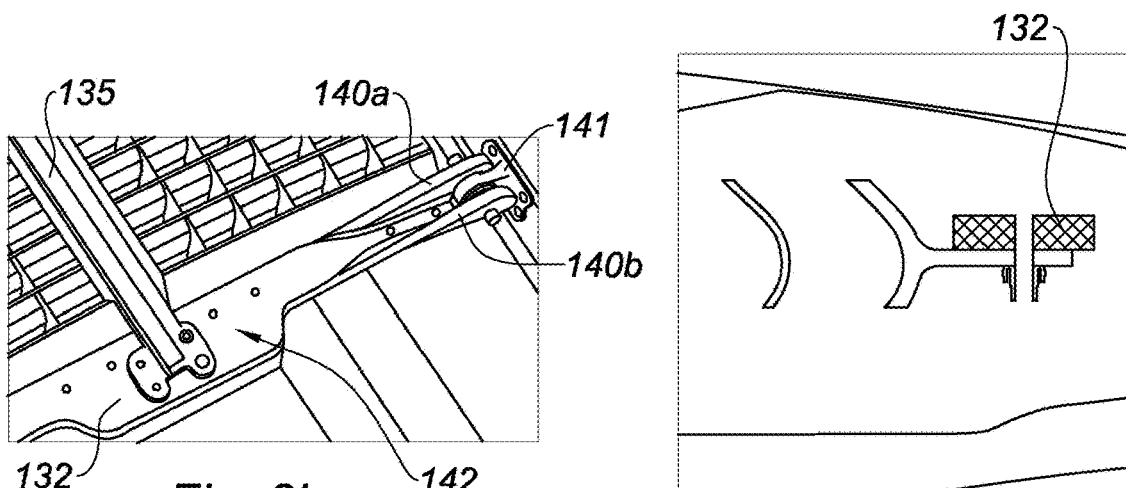
Fig. 3b
Fig. 3c
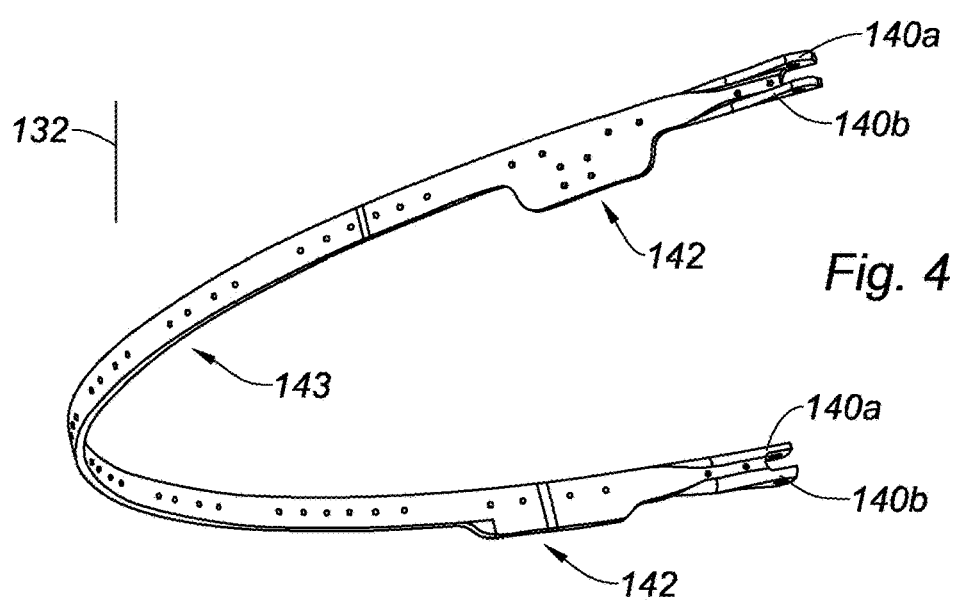
Fig. 4 ized by the sliding of the cowling generally resulting in a closure of the annular channel downstream of the cascades so as to optimize the reorientation of the cold air flow.

REAR FRAME FOR A THRUST REVERSER STRUCTURE WITH DIVERSION GRIDS

CROSS-REFERENCE TO RELATED APPLICATIONS

This application is a continuation of International Application No. PCT/FR2015/051852, filed on Jul. 3, 2015, which claims the benefit of FR 14/56475 filed on Jul. 4, 2014. The disclosures of the above applications are incorporated herein by reference.

FIELD

The present disclosure relates to the field of aircraft nacelles and concerns their thrust reverser devices. More particularly, the present disclosure concerns a rear frame for a thrust reverser structure with cascade vanes for a nacelle of an aircraft.

BACKGROUND

The statements in this section merely provide background information related to the present disclosure and may not constitute prior art.

An aircraft is moved by several turbojet engines each housed in a nacelle also accommodating a set of auxiliary actuating devices related to the operation thereof and ensuring various functions when the turbojet engine is operating or shut-down. These auxiliary actuating devices comprise, in particular, a mechanical thrust reverser system.

More specifically, a nacelle generally presents a tubular structure comprising an air inlet upstream of the turbojet engine, a mid-section intended to surround a fan of the turbojet engine, a downstream section accommodating the thrust reversal means and intended to surround the combustion chamber of the turbojet engine, and is generally ended by an ejection nozzle, the outlet of which is located downstream of the turbojet engine.

Modern nacelles are intended to accommodate a bypass turbojet engine capable of generating, via the blades of the rotary fan, a hot air flow (also called main flow) coming from the combustion chamber of the turbojet engine, and a cold air flow (secondary flow) which circulates outside of the turbojet engine through an annular channel, also called flow path, formed between a fairing of the turbojet engine and an inner wall of the nacelle. The two air flows are ejected out from the turbojet engine from the rear side of the nacelle.

The role of a thrust reverser, during the landing of an aircraft, is to improve the braking capability thereof by redirecting forwards at least one portion of the thrust generated by the turbojet engine. In this phase, the thrust reverser obstructs the annular channel of the cold air flow and directs said cold air flow forward of the nacelle, consequently generating a counter-thrust which is added to the braking of the wheels of the aircraft.

The means implemented to make this reorientation of the cold air flow vary depend on the thrust reverser type. However, in all cases, the structure of a thrust reverser comprises movable cowls displaceable between, on the one hand, a deployed position in which they open in the nacelle a passage intended for the diverted flow, and on the other hand, a retracted position in which they close this passage. These cowls may fulfill a diverting function or simply an activation function of other diverting means.

In the case of thrust reverser with cascade vanes, also known as cascade-type thrust reverser, the reorientation of the air flow is performed by cascade vanes associated to thrust reverser flaps, the cowl having only a simple sliding function aiming to uncover or cover the cascade vanes. The thrust reverser flaps form blocking doors activated by the sliding of the cowling generally resulting in a closure of the annular channel downstream of the cascades so as to optimize the reorientation of the cold air flow.

Conventionally, the connection of the engine to the aircraft is performed by means of a support structure comprising two upper longitudinal beams, conventionally called 12 hours (or 12 o'clock) beams because of the position thereof at the top of the nacelle, two lower longitudinal beams, conventionally called 6 hours (or 6 o'clock) beams because of the position thereof in the lower portion of the nacelle, and a assembly having a substantially annular shape called front frame, actually formed of two front half frames each extending between said upper and lower longitudinal beams, and intended to be fastened to the periphery of the downstream edge of the casing of the fan of the motor.

The thrust reverser cascades are generally connected to each other by means of a thrust reverser rear frame. As shown in FIGS. 1a and 1b, such a rear frame 1 generally has a C-shaped (FIG. 1a) or L-shaped (FIG. 1b) section, so as to increase the inertia of the structure, and is provided with two ends each fitted with a fastening clevis 2 connected to the 12 hours beam and the other connected to the 6 hours beam. This frame has a fitting 3 for the passage of an actuating cylinder of the thrust reverser cascades in the direction of the thickness of the thrust reverser rear frame. Such a fitting imposes making a thrust reverser frame having a significant bulk in order not to weaken the structure of the thrust reverser rear frame, and thus deteriorating its characteristics of structural resistance to the stresses to which it is subjected during use. Therefore, besides a significant bulk, such a rear frame also has a significant weight. In some configurations, the cascades are directly connected to each other without the use of a rear frame. This solution has the drawback of shortening the effective surface of the cascades and requires elongating the cascades in order to have an equivalent effectiveness.

Consequently, techniques have been developed to make lighter rear frames while preserving a significant bulk so as to allow the realization of the fitting for the passage of the actuating cylinder of the thrust reverser cascades while deteriorating as less as possible the structural characteristics of the rear frames. These technologies consist in the use of materials such as composites.

Nevertheless, so far, these technologies have not provided the reduction of the bulk of the thrust reverser rear frame even though such a reduction might have multiple technical advantages.

SUMMARY

The present disclosure provides a thrust reverser rear frame noteworthy in that it has a less bulk, and in that it is lighter weight, while providing structural characteristics satisfactory for its use made thereof in the thrust reverser devices of aircraft nacelles.

In one form, the present disclosure relates to a rear frame for a thrust reverser structure with cascade vanes of a nacelle of an aircraft, the nacelle comprising at least two longitudinal beams. The rear frame is intended to be fastened to the two beams and to hold one or several cascade vane(s) in cooperation with a front frame. The rear frame includes a common section with a substantially headband-like shape. In particular, "headband-like shape" means a substantially flat and generally narrow shape. The two longitudinal beams are typically the 12 hours beam and the 6 hours beam.

The headband-like shaped frame operates despite a much lower inertia than the related art because it acts like a barrel. The radial loads of the cascades make the structure "swell" and bias the frame only circumferentially.

The rear frame may include at each of its ends fastening structures for the fastening to the two longitudinal beams.

Typically, the common section extends between the fastening structures.

At least one of the fastening structures may comprise a clevis, which may advantageously be integrated into the rear frame so as to form only one single piece with the rear frame. Said at least one clevis may be in the form of a twin clevis, enabling in particular limiting the bending stresses on the rear frame.

The common section with a substantially headband-like shape may further comprise at least one enlarged section allowing disposing a stiffening element between the rear frame and the front frame.

Advantageously, the rear frame may be made from a composite material. In particular, plies of a preform of the rear frame may be woven according to a 3D weaving method.

Moreover, the rear frame in one form comprises cascades fasteners centered and aligned on the frame, allowing a proper introduction of forces.

According to a second form, the present disclosure relates to a thrust reverser structure with cascade vane for a nacelle of an aircraft, said structure comprising at least one cascade vane and at least one rear frame according to the first form above, said at least one rear frame being configured to hold said at least one cascade vane.

According to a third form, the present disclosure relates to a nacelle including a thrust reverser structure according to the second form above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3a is a perspective view of the environment of the rear frame, according to one form of the present disclosure;

FIG. 3b is a detail view perspective of the rear frame, according to one form, in its environment;

FIG. 3c is a sectional view of the rear frame, according to one form, in its environment; and FIG. 4 is a perspective view of one form of a rear frame according to the present disclosure.

In all these figures, identical or similar reference numbers refer to identical or similar members or sets of members.

Figure 1A:
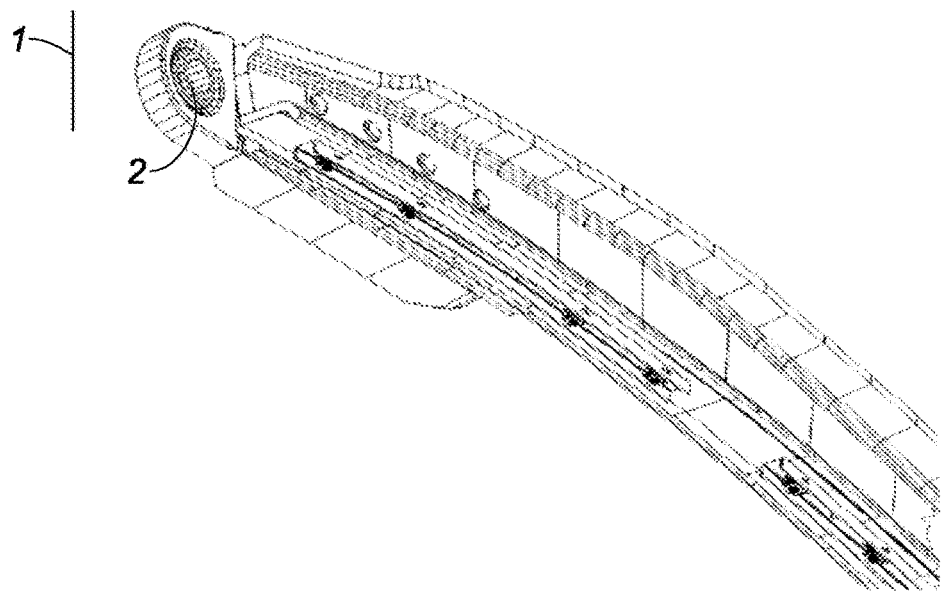
FIG. 1a is a perspective partial view of a rear frame, generally showing a C-shaped section, according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
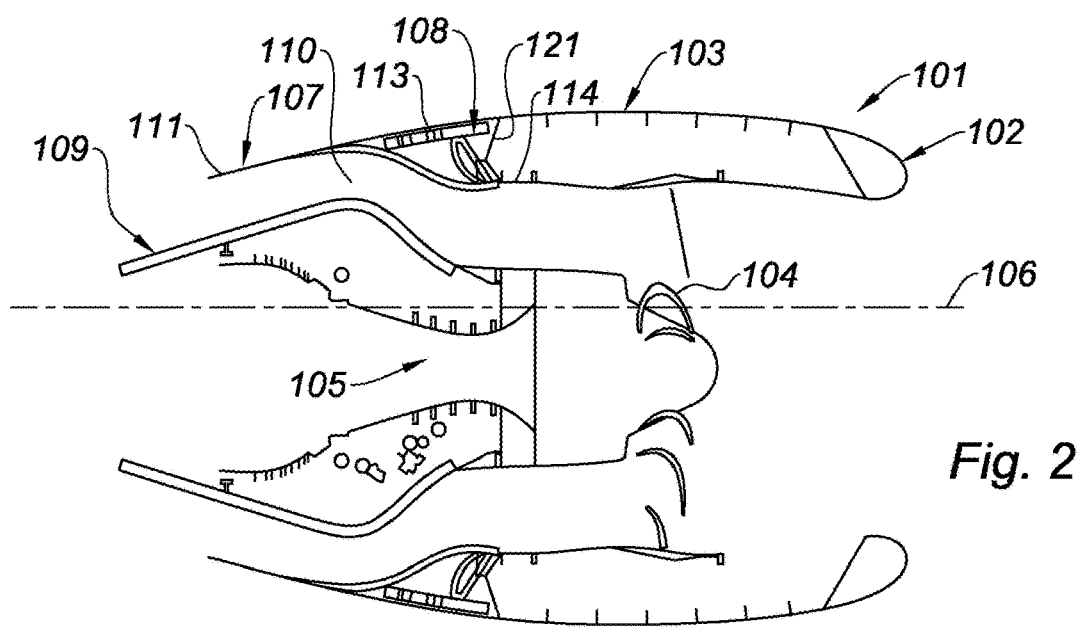
FIG. 2 is a schematic representation of a longitudinal section of a nacelle.

According to one form shown in FIG. 2, a nacelle 101 comprises an air inlet upstream structure 102, a mid-section 103 surrounding a fan 104 of a turbojet engine 105, and a downstream section.

The nacelle 101 is tubular shaped with a longitudinal axis 106. "Longitudinal" as used herein means a direction substantially co-linear with the longitudinal axis of the nacelle. "Transverse" as used herein means a direction substantially perpendicular to the longitudinal axis of the nacelle.

Figure 1B:
FIG. 1b is a perspective partial view of a rear frame, generally showing an L-shaped section, according to the prior art.

The downstream section includes in a manner known per se an outer structure 107, called OFS, accommodating thrust reversal means 108, and an inner structure 109, called IFS. The nacelle 101 is fastened downstream by means of any appropriate means, in particular by a connecting rod, to a suspension means, (not shown in FIG. 1), intended for attaching the nacelle 101 under an aircraft wing.

The inner structure 109 is intended to cover a downstream portion of the turbojet engine 105 extending downstream of the fan so as to delimit an annular channel for the passage of the hot air flow.

The outer structure 106 and the inner structure 109 also define another annular flow channel 110 for the cold air flow.

More specifically, the thrust reversal means 108 of the downstream section include at least one movable cowl 111 covering cascade vanes 113. The cascade vanes 113 are connected to the mid-section and to the casing 114 of the turbojet engine via a front frame 121.

Referring also to FIGS. 3a, 3b, 3c, a rear frame according to one form of the present disclosure is illustrated. The connection of the engine to the aircraft is performed by means of a support structure comprising two upper longitudinal beams, conventionally called 12 hours beams 131 because of the position thereof at the top of the nacelle, two lower longitudinal beams (not visible in FIG. 2), conventionally called 6 hours beams because of the position thereof in the lower portion of the nacelle, and the front frame 121 intended to be fastened to the periphery of the downstream edge of the casing of the fan of the motor.

The thrust reverser cascades 113 are connected to each other and held by means of the rear frame 132. An isolated perspective view of the rear frame 132 is in particular illustrated in FIG. 4. The rear frame 132 is intended to be fastened between the 12 hours beam and the 6 hours beam. In particular, the rear frame 132 includes at each of its ends fastening structures 140 to enable the fastening to the two longitudinal beams. As shown in FIG. 3a, the fastening structures 140 in one form comprise for example a twin clevis 140a, 140b, at each end of the rear frame 132, capable of cooperating with a fitting 141, disposed on the 6 hours and 12 hours beams. "Fitting" 141 as used herein means in particular a set of intermediate parts between the beams and the rear frame. In the embodiment illustrated in FIGS. 3b and 4, the twin clevis 140a, 140b is integrated into the rear frame 132 so as to form only one single piece with the rear frame.

The rear frame 132 includes a common section 143 with a substantially headband-like shape. The common section 143 has a substantially flat and narrow shape. Thus, thanks to the shape of the common section 143, the rear frame 132 no longer presents a fitting for the passage of an actuating cylinder 134 of the thrust reverser cascades (as set forth above), and features a reduced bulk and weight.

In the form illustrated in FIGS. 3 and 4, the rear frame 132 and its common section 143 having a substantially headband-like shape comprises enlarged sections 142. Thus, it is possible to dispose a stiffening element 135, such as a secondary rail, between the rear frame and the front frame, in order to stiffen the structure.

The rear frame may be made from a composite material. In particular, plies of a preform of the rear frame may be woven according to a 3D weaving method.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser structure disposed within a nacelle of an aircraft, the nacelle comprising at least two longitudinal beams, the thrust reverser structure comprising:
    a front frame;
    cascade vanes;
    a rear frame being configured to be fastened to the at least two longitudinal beams and to hold at least one of the cascade vanes in cooperation with the front frame, wherein the rear frame includes a common section with a substantially headband-like shape that is a substantially flat and generally narrow shape, and extends between a pair of enlarged sections, the rear frame being disposed above a rear portion of the cascade vanes.

2. The thrust reverser structure according to claim 1, wherein the rear frame includes at each of its ends fastening structures for fastening the rear frame to the at least two longitudinal beams.

3. The thrust reverser structure according to claim 2, wherein the common section extends between the fastening structures.

4. The thrust reverser structure according to claim 2, wherein at least one of the fastening structures comprises a clevis.

5. The thrust reverser structure according to claim 4, wherein said at least one clevis is integrated into the rear frame so as to form a single piece with the rear frame.

6. The thrust reverser structure according to claim 4, wherein said at least one clevis is in the form of a twin clevis.

7. The thrust reverser structure according to claim 1, further comprising a stiffening element between the rear frame and the front frame, wherein the stiffening element is attached to one of the enlarged sections of the rear frame.

8. The thrust reverser structure according to claim 1, wherein the rear frame is made from a composite material.

9. The thrust reverser structure according to claim 1, wherein the rear frame holds the cascade vanes.

10. A nacelle including a thrust reverser structure according to claim 1.

* * * * *